US008542087B1

(12) United States Patent
Spector

(10) Patent No.: US 8,542,087 B1
(45) Date of Patent: Sep. 24, 2013

(54) COMBINED AUDIO/VIDEO MONITOR AND LIGHT BOX ASSEMBLY

(76) Inventor: Donald Spector, New York, NY (US)

( * ) Notice: Subject to any disclaimer, the term of this patent is extended or adjusted under 35 U.S.C. 154(b) by 59 days.

(21) Appl. No.: 13/136,238

(22) Filed: Jul. 27, 2011

Related U.S. Application Data

(63) Continuation-in-part of application No. 10/949,987, filed on Sep. 24, 2004, now abandoned, which is a continuation-in-part of application No. 09/604,644, filed on Jun. 27, 2000, now Pat. No. 6,812,822, which is a continuation-in-part of application No. 09/065,732, filed on Apr. 24, 1998, now Pat. No. 6,084,527, which is a continuation-in-part of application No. 08/785,815, filed on Jan. 9, 1997, now Pat. No. 5,774,861.

(51) Int. Cl.
*G05B 23/02* (2006.01)

(52) U.S. Cl.
USPC .......... 340/3.1

(58) Field of Classification Search
USPC ...... 340/3.1, 5.1, 13.24, 471, 7.5; 455/404.1, 455/418
See application file for complete search history.

(56) References Cited

U.S. PATENT DOCUMENTS

| | | | | |
|---|---|---|---|---|
| 4,640,034 | A | 2/1987 | Zisholtz | |
| 5,311,875 | A | 5/1994 | Stasz | |
| 5,505,199 | A | 4/1996 | Kim | |
| 6,192,257 | B1 | 2/2001 | Ray | |
| 6,280,392 | B1 | 8/2001 | Yoshimi et al. | |
| 6,679,830 | B2 | 1/2004 | Kolarovic et al. | |
| 6,720,879 | B2 | 4/2004 | Edwards | |
| 6,968,294 | B2 * | 11/2005 | Gutta et al. | 702/188 |
| 7,009,520 | B2 | 3/2006 | Thompson | |
| 2004/0082840 | A1 | 4/2004 | Chen | |
| 2005/0080322 | A1 | 4/2005 | Korman | |
| 2007/0004969 | A1 | 1/2007 | Kong et al. | |
| 2009/0106045 | A1 | 4/2009 | Bae et al. | |
| 2010/0190480 | A1 | 7/2010 | Zheng et al. | |

* cited by examiner

*Primary Examiner* — Vernal Brown
(74) *Attorney, Agent, or Firm* — Collard & Roe, P.C.

(57) ABSTRACT

Apparatus including a combined monitor and display assembly installable in an area occupied by an individual, and at the location occupied by the individual's caregiver. There is a microphone and video camera to provide sounds generated by the individual or an image of the individual and an audio or video transmitter connected to the microphone and camera to transmit a signal from the microphone and video camera that is intercepted by a mobile telephone so that the signal can be heard or seen by an observer at a site remote from the enclosure. The distress sounds are pre-programmed into the device so that only pre-selected distress sounds cause the mobile telephone to be contacted.

4 Claims, 3 Drawing Sheets

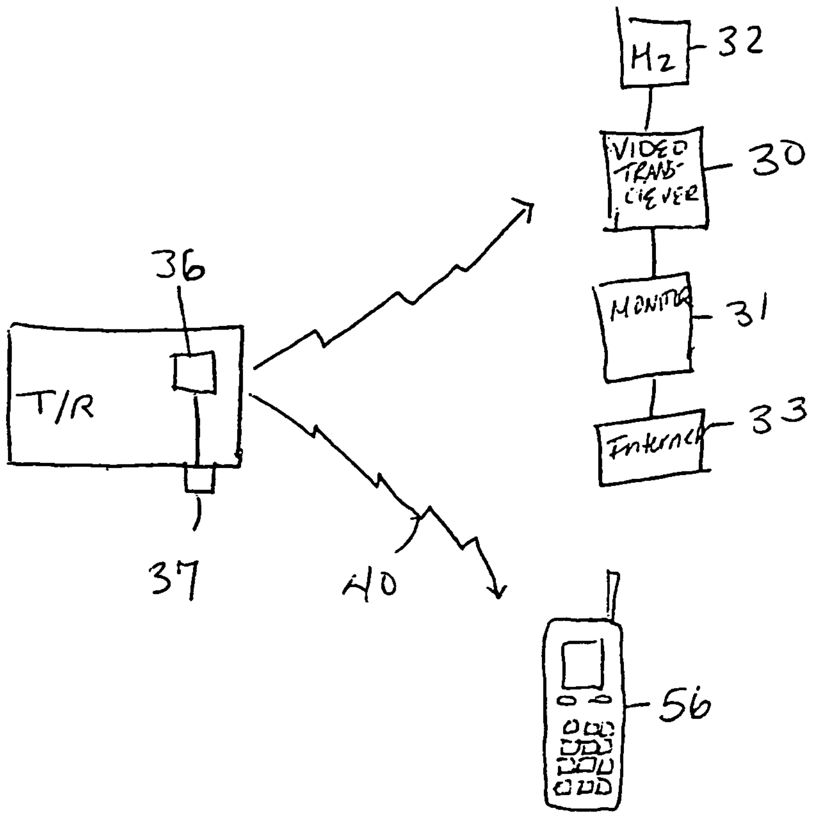
F16.4

COMBINED AUDIO/VIDEO MONITOR AND LIGHT BOX ASSEMBLY

CROSS REFERENCE TO RELATED APPLICATIONS

This is a continuation-in-part of U.S. patent application Ser. No. 10/949,987 filed on Sep. 24, 2004, which is a continuation-in-part of U.S. patent application Ser. No. 09/604,644 filed on Jun. 27, 2000, now U.S. Pat. No. 6,812,822 issued Nov. 2, 2004, which is a continuation-in-part of U.S. patent application Ser. No. 09/065,732 filed on Apr. 24, 1998, now U.S. Pat. No. 6,084,527 issued Jul. 4, 2000, which is a continuation-in-part of U.S. patent application Ser. No. 08/785,815 filed on Jan. 9, 1997, now U.S. Pat. No. 5,774,861 issued Jun. 30, 1998 entitled "Mirror and Light Box Assembly with Mother's Image Display and Voice Playback Activated by Crying Infant". The disclosures of all of these applications and patents are herein incorporated by reference.

BACKGROUND OF THE INVENTION

1. Field of the Invention

This invention relates to a light box assembly in which a light bulb within the box serves to illuminate a film transparency placed behind a semi-reflective mirror mounted on the face of the box whereby the transparency image is visible only when the bulb is energized, and more particularly to an assembly that has an electronic monitor which transmits the image and sounds of the infant or patient to a transceiver in the located proximate to the caregiver and to a mobile telephone of the caregiver, in response to a distress sound made by the infant or patient.

2. The Prior Art

It is known in the toy field to provide a "Magic Mirror" in which placed behind a semireflective mirror is a light box covered by a film transparency. When an electric light bulb within the box is turned on to illuminate the transparency, a child looking at the mirror then does not see his own reflection, but the illuminated image, for the mirror is then effectively transparent. Also included in a Magic Mirror toy is a sound unit which when the bulb on the light box is turned on, then reproduces recorded sounds appropriate to the image being presented. Thus, if the image is that of a dog, the reproduced sounds would be that of a dog barking.

Essential to a Magic Mirror and to an assembly in accordance with the invention is a mirror which in one mode of operation is effectively transparent and in another is effectively reflective. For this purpose, the mirror must be a semi-reflective mirror.

A conventional plane mirror is fabricated by evaporating a metallic film on the rear surface of a transparent plate made of glass or acrylic plastic material. In most mirrors, the reflecting film is aluminum which is deposited on a substrate by evaporation in vacuum. The advantage of aluminum is that it has a broad spectral band of high reflectivity. Almost all aluminum-coated mirrors are "overcoated" with a thin protective layer, such as a layer of magnesium fluoride.

While a conventional aluminum-coated mirror has an average reflectivity of close to 90 percent, mirrors are known whose coating imparts semi-reflective characteristics thereto. Thus, a beam impinging on a semi-reflective mirror is split into two parts, one begin transmitted through the mirror, the other being reflected thereby.

If the face of a light box is covered by a semi-reflective mirror behind which is a film transparency, then when the box is dark, an observer looking into the mirror sees his own reflection. But if the box interior is illuminated, the observer then sees the image of the transparency, for the mirror is then operating in a light transmitting mode.

The concern of the present invention is with a light box and mirror assembly that is installable in a crib or other enclosure occupied by an infant or adjacent a bed for an adult patient or older child in need of monitoring, the assembly being interactive with the infant or patient in a manner to be later explained. The most difficult aspect of infancy from a mother's standpoint lies in the sleep habits of her infant. Whether an infant lying in a crib or other enclosure is able to sleep soundly depends on two factors, one being physical and the other psychological. The physical factor turns mainly on whether the infant is hungry or in pain, for in either case the infant will be unable to sleep and will cry out to attract its mother's attention. But many infants who are not disturbed physically, are unable to sleep soundly because they are in a state of anxiety.

An infant's existence centers on its mother, and a sense of security in regard to its mother is therefore essential to the infant's proper psychological equilibrium. All infants, however well cared for, remain anxious as to their mother's whereabouts. This insecurity does not vanish in later years, for many pre-school children carry security blankets to reduce anxiety. The crib in which an infant lies is usually placed in the mother's bedroom or in a nursery adjacent this bedroom so that should the infant cry out, the mother will be aroused from sleep and attend to her baby. But whether in the course of a night the mother is awakened by her infant because the infant is physically uncomfortable or in a state of anxiety, in either event, the mother's sleep is interrupted. A mother's loss of sleep is perhaps the most exhausting aspect of raising an infant. A similar situation exists with elderly patients who have dementia. These patients often need frequent supervision, monitoring and reassurances, even during normal sleeping hours.

U.S. Pat. No. 4,640,034 to Zisholtz discloses a playback device activated by the sound of a crying child to play a recording of the mother's voice. It is also known to provide an electronic monitor to radio-transmit the sounds made by an infant in a crib to a receiver in the necessity of the infant's mother or caregiver.

SUMMARY OF THE INVENTION

In view of the foregoing, it is an object of this invention to provide a combined monitor and light box assembly that is interactive with the infant or patient.

It is another object of this invention is to provide an assembly of the above type which in response to an infant's cries or patient's distress signals, presents the infant or patient with an image of a known caregiver accompanied by his or her voice message, thereby assuring the infant or patient of its caregiver's attention, the sounds and an image of the infant or patient being transmitted to a mobile telephone that can be monitored by the caregiver.

A significant feature of the invention is that the assembly is customized for the particular infant or individual to be comforted, for the image displayed by the assembly is that of the infant's or patient's actual caregiver and the voice message it hears comes from the same caregiver. Hence the assembly functions as a virtual or surrogate caregiver.

These objects are attained by a combined monitor and light box assembly installable in a crib or other enclosure occupied by an infant or adjacent a patient bed. The assembly which is interactive with the infant or patient includes a light box on whose front face is mounted a semi-reflective mirror behind which is a film transparency having a photographic image of the infant's or patient's caregiver. When an electric light bulb in the box is energized to illuminate the transparency, the image of the caregiver becomes visible to the infant or patient through the then effectively transparent mirror.

Associated with the light box is a sound-activated switching device connected between the bulb and a power source. The switching device, when activated by distress sounds emanating from the individual, remains activated for a predetermined period to energize the bulb and illuminate the transparency. Also associated with the light box is a record playback unit having stored therein a voice message recorded by the caregiver addressed to the individual, the unit being rendered operative only when the bulb is energized. Hence, when the infant cries or the patient calls out, it is then presented with an image of its caregiver and at the same time it hears their comforting message, as a consequence of which the infant is induced to stop crying or the individual is comforted. The monitor which is operative only when the switch is activated, also transmits the image and the sounds then emanating from the infant or patient to a receiver in a mobile telephone of the caregiver, which then can be viewed and heard by the caregiver. The caregiver can then activate the pre-recorded sounds and/or talk to the infant or patient. The caregiver can then also communicate with the individual via the mobile telephone as well.

In addition, the sound activated monitor is equipped with software that trains the monitor to learn which sounds or motions are important, and which ones do not require intervention. Frequently, those who wish to communicate but have problems with communication due to age, disability or language comprehension have in effect their own language, which is often not understood by others, and certainly not by computers. However, with training, the recognition software can be trained to differentiate between the types of sounds that are annoyances and the types that require attention. The child's or patient's language can be either audible sounds or movements that are converted into a language. A camera in the light box is connected to the recognition software to convert movements that require attention into a language that can be understood by the software. In addition, the software can also be trained to differentiate sounds and motions based on the duration of the sound or motion. For example, if an infant is engaging in low level crying, the software might not initially trigger the light box or call the caregiver, but if the distress signal persists for a predetermined period of time the light box would be activated and the sounds and motions could be transmitted to the caregiver.

As explained above, in situations when the infant or patient is in great distress or requires immediate assistance, the communication can be transmitted via a cellular or digital line to the mobile telephone. If the user of the device is a patient, the patient can then communicate with the caregiver or other suitable person via the mobile telephone. Once the caregiver receives the language that requires attention from the mobile phone, the caregiver can then talk directly to the patient or infant, or can dispatch the necessary live assistance. Many mobile telephones also have video capability, so the caregiver can communicate with the patient or individual via video as well.

Thus, the system according to the invention can proceed through several different channels in order to comfort the individual in distress. First, the pre-recorded voice and picture appear in the light box. And second, the distress sounds and images can be transmitted to the caregiver's mobile telephone.

The recognition software can be programmed to respond in different ways to different types of distress sounds. For example, for a low level of distress, the device can be programmed to turn on the light box and automated message only. If the distress level reaches a certain higher level, the system can send the sounds and messages to the caregiver's mobile telephone as well. This is helpful in a situation where an infant is being cared for at home by a babysitter, but the infant's distress level is high enough that a parent should be notified as well. This also applies to adult patients in hospitals or nursing homes, where a relative or other caregiver might want to be notified of distress.

The recognition software can be customized so as to activate the monitor only upon certain signals of distress, such as crying or calling out. The software can be programmed based on pre-recorded sounds of the particular infant or patient or based on a generic pre-selected group of sounds, so that the monitor is triggered only when a sound similar to the pre-recorded distress signal is received. This allows the system to filter out other sounds that might trigger the transmitter, such as a loud television, traffic noises or other people in the area. This is important in a nursing home or hospital situation, where the patient might be sharing a room. Sounds of a roommate's distress would not be transmitted to the mobile telephone of the caregiver.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 4 is a block diagram of a further embodiment of the invention, in which the system also sends information to a mobile telephone.

DETAILED DESCRIPTION OF THE PREFERRED EMBODIMENT

Figure 1:
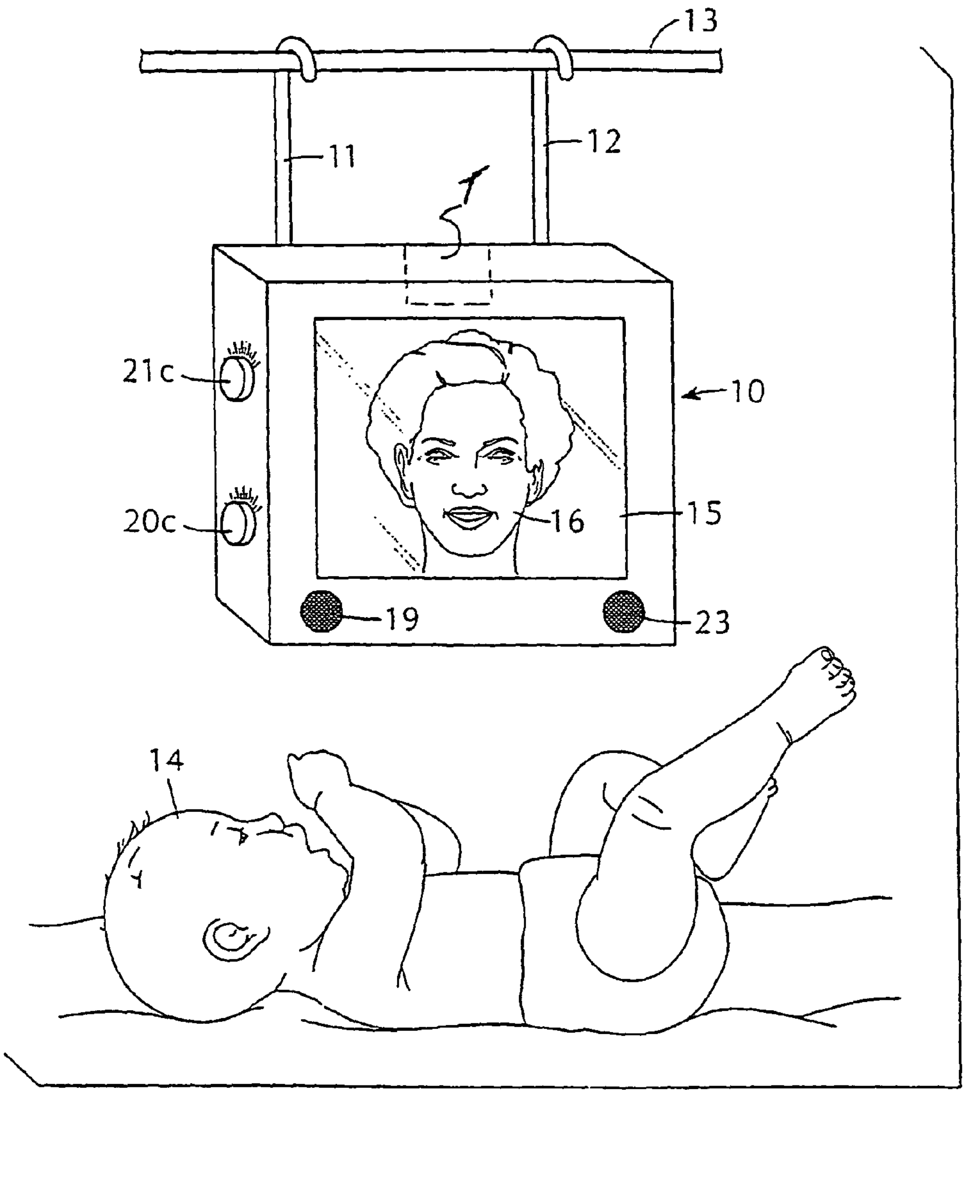
FIG. 1 shows a combined monitor and box assembly in accordance with the invention installed in a crib occupied by an infant.
Figure 2:
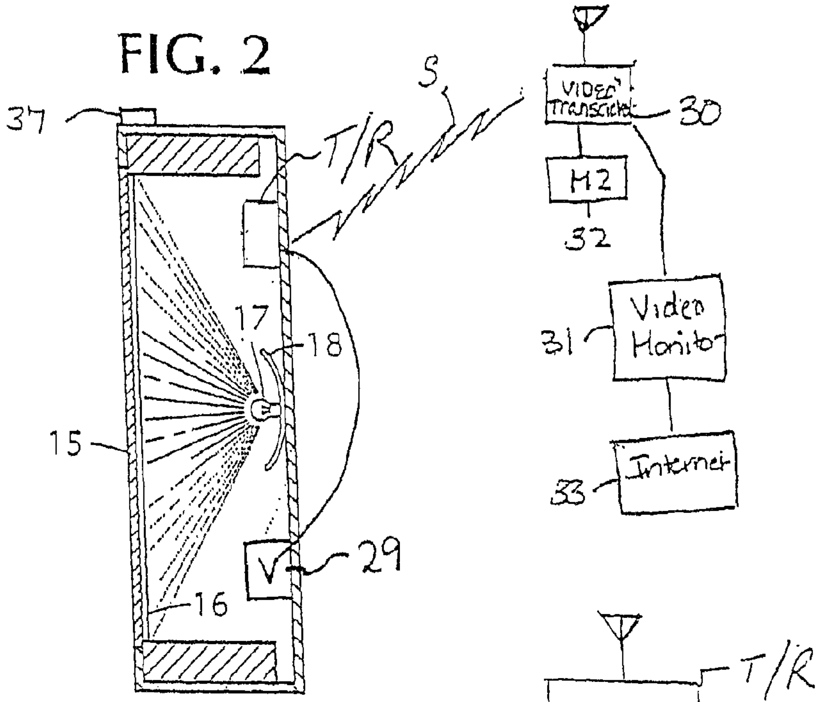
FIG. 2 is a section taken through the assembly.

Referring now to FIGS. 1 and 2, there is shown a combined monitor and light box and mirror assembly in accordance with the invention, generally identified by reference numeral 10. In this description, the assembly is used in conjunction with an infant. However, the assembly is also suitable for use with adults or older children who are in need of monitoring. The assembly is provided with a pair of hooks 11 and 12 so that it can be suspended from a rail 13 or other horizontal structure on a crib or enclosure at a position where it can be seen by an infant 14 lying in the crib. In practice, the assembly exterior may be padded so as not to cause injury should the infant make physical contact therewith. Alternatively, the assembly could be configured with clamps for positioning on a rail of a hospital bed or other structure.

Mounted on the front face of the generally rectangular box 10 is a semi-reflective planar mirror 15. This mirror is preferably formed of a non-shatterable transparent acrylic plastic plate having a coating on its rear surface that renders the mirror semi-reflective. Placed behind mirror 15 is a rectangular film transparency 16 containing a photographic image of the head of the caregiver for which the assembly is intended. The head of the caregiver is preferably in full scale so that when seen by the infant or patient, the infant or patient gains the impression that it is seeing its actual caregiver.

Mounted at the rear of box 10 is an electric light bulb 17 placed within a concave reflector 18 so that the rays radiating from the bulb are directed toward transparency 16. The bulb is preferably a low-voltage bulb so that it may be battery operated whereby the assembly is self contained and need not be plugged into a power outlet. However, to obtain a greater light output, a high voltage electric bulb may be used. And to obtain uniform illumination of the transparency, a light diffusion plate may be placed behind the transparency.

When the light bulb is turned off, the box interior is dark and the semi-reflective mirror 16 then operates in a reflecting mode, for light impinging on its outer surface is reflected thereby. Hence should infant 14 then look into the mirror, the infant will see its own reflection. But when light bulb 17 is turned on, the light radiated by the bulb illuminates transparency 16 and what the infant then sees through the mirror then in a light transmitting mode, is an image of its own mother.

The arrangement is such that the assembly is activated only when the infant cries loudly, for should the infant just whimper or sob lightly, there is no need to activate the assembly. To this end, associated with the assembly is a sound-activated switching device that includes a microphone 19 placed in the front of box 10 adjacent its left side below mirror 15, to pick up sounds emanating from infant 14. The output of microphone 19 is connected through an adjustable threshold device 20 to an adjustable timer switch 21 which when operative, simultaneously closes switches S1 and S2.

Threshold device 20 is an adjustable bias circuit that is set by the user of the assembly to activate timer switch 21 only when the sounds of the infant's crying as picked up by microphone 19 exceeds in amplitude a predetermined threshold level. Control knob 20C for threshold device 20 is on the side of the box, so that the user can set the threshold to a level appropriate to the infant, because some infants are capable of crying much more loudly than others. For an infant whose loudest cries are relatively low amplitude, the threshold setting should be such as to activate the assembly when the amplitude of the cries is relatively low. For any given infant, the threshold setting must be such as to activate the assembly when the cries are loud for that infant, and not to activate the assembly when for that infant the cries are relatively soft.

The timing period of timer switch 21 is adjustable by a control 21C which is also on the side of the box so that the user can adjust the time duration to a period appropriate to the infant, say in a range of about 1 to 5 minutes. The duration during which the infant is presented with an image of its mother should be long enough to relieve the infant's anxiety as to the whereabouts of its mother.

However, if at the end of the timed period, the infant is still crying, the timer switch 21 will be reactivated by these crying sounds.

When timer switch 21 is activated by the sounds of the infant to close switch S1, this switch then connects light bulb 17 to a battery 22 or whatever other power source is used to energize the bulb. In practice instead of an incandescent bulb, use may be made of a battery-operated fluorescent bulb which for a given wattage produces a greater light output than an incandescent bulb of the same wattage. Timer switch 21 closes switch S2 at the same time it closes switch S1. Switch S, when closed, activates a record play back unit associated with the assembly. The unit includes a miniature loud speaker 23 mounted on the front face of box 10 below the mirror on the right side.

The record playback unit has digitally stored in a Read-Only-Memory (ROM) 24 a series of short voice messages recorded by the mother of the infant. Hence the assembly must be tailored to whomever acquires the assembly, for the assembly must include a photographic transparency of the mother and a recording of her voice. The mother's message is intended to comfort her infant and preferably therefore should be a message which is already familiar to the infant from past experience. Thus, one message could be "hush-a-bye baby, go to sleep," another could be "Go to sleep, Go to sleep, Baby Go-to-Sleep" and still another "it will be all right my baby, my baby it will be all right." The series of messages formulated by the mother are those she believes will be comforting to her baby.

Coupled to ROM 24 is a sequencer 25 which each time switch S2 closes, then acts to read out from ROM 24 the next one in the series of recorded voice messages. Thus, if stored in the ROM are five brief voice messages and the previous messages read out was number five in the series, sequencer 23, when switch S2 closes, will read out message number one. Thus, the same message is not repeated when the sound play back unit is activated, and the infant hears a message that is different from the one he heard before. It is important that the infant not gain the impression of a robot mother which would be the case where every time the infant cried he heard the same message from his mother.

The message read out of ROM 24 is converted into an analog signal by a digital-to-analog converter 26. This analog signal is amplified in an amplifier 27 whose output is applied to loudspeaker 23. All stages of the record play back unit can be integrated into a solid state circuit chip except for microphone 19. This unit is powered by battery 28.

Thus, when the infant in the crib cries loudly, then simultaneously activated for a predetermined period is the lighting system which illuminates the transparency image of the infant's mother and the record playback unit which yields the voice message of the mother. This audiovisual presentation assures the infant of its mother's concern and relieves the infant of whatever anxiety is disturbing its sleep.

But the assembly is not limited in its utility to a sleeping infant, for if the baby cries while awake, the assembly will be activated to comfort the child. And if the infant is being taken care of not by its mother, but by a nanny, nurse, or other caregiver, then the transparency will show that of the nanny or nurse, and the recorded voice will be of the same individual.

The Electronic Monitor

In order to alert the caregiver to a condition that requires attention, an electronic monitor is combined with the light box assembly. The monitor transmits from the crib a video picture and the sounds emanating from the infant, the transmission being intercepted by a portable receiver such as a mobile telephone which can be monitored by the caregiver at a site remote from the crib.

To this end, mounted within light box 10 is a miniature video camera 29 ("V") coupled to a battery-powered transmitter/receiver unit ("transceiver") T/R. Unit T/R is also coupled to a microphone 19 so that when the unit is turned it then transmits the crib sounds then being picked up by the microphone and the video image from camera 19. Video camera 29 may be of any suitable type including the readily available, inexpensive "web-cams" which are sold for computer and Internet applications. Transceiver T/R may be a radio, infrared or a wired type of audio/video transmitter and receiver.

The period during which transceiver unit T/R is turned on need not be restricted to the period during which switch S3 is closed by timer switch 21. In practice, unit T/R can include a delay circuit which is triggered when switch S3 is closed to maintain the unit T/R in operation for a predetermined period, say 3 to 5 minutes.

The signal S transmitted by unit T/R is picked up by an audio video transceiver 30 connected to a video monitor 31 (VM), which is placed wherever the caregiver is located. Transceiver 30 is inoperative when transmitter unit T/R is switched off, and only reproduces the sounds and image of the infant lying in the crib when the light box in the crib is activated. Video monitor 31 may be a separate video monitor or be the monitor of a standard personal computer.

In this way, should the mother be asleep in her bedroom, the mother will not be awakened by sounds emanating from her infant in the crib unless the sounds are such as to activate the light box, in which case the sounds are indicative of a disturbed state that requires the mother's attention.

Figure 3:
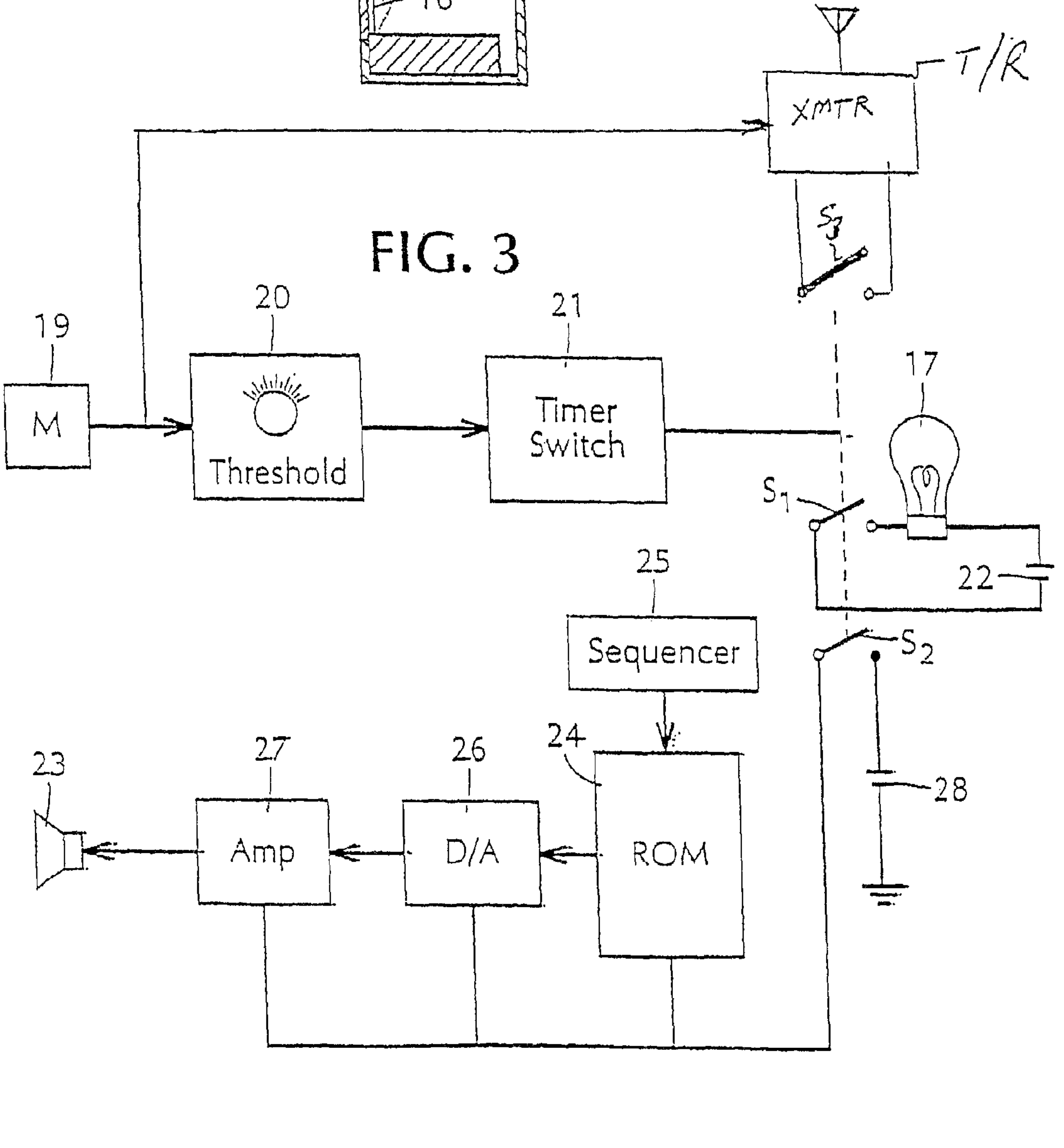
FIG. 3 is a block diagram of the sound-activated switching device, the record playback unit and the audio/video transmitter included in the assembly.

The image of the mother provided by the light box assembly and the recorded voice of the mother may be sufficient to quiet the infant; in which case there is no need for the mother to leave her bed. But it is only if the crying sounds which are heard over the monitor persist, that it then may become necessary for the mother to leave her bed to attend to her infant. Additionally, the caregiver or can also use transceiver 30 to transmit the caregiver's voice back to the infant. Transceiver 30 is connected to a microphone 32 (M2), which can be of the type commonly supplied with personal computers, to pick up the caregiver's voice. It is seen in FIG. 3 that transceiver T/R at the light box is connected to amplifier 27 which in turn in connected to speaker 23 to allow the caregiver's live voice and image to override the prerecorded message if the caregiver deems it appropriate. Furthermore, the use of a personal computer or mobile telephone as the monitoring device can enable the remote monitoring of the infant via the Internet or over a cellular telephone network which is schematically illustrated by block 33. This can occur if the mother, for example, is at work or otherwise away from the home. Of course a live caregiver, such as baby sitter, must he in close proximity to the infant the render assistance if necessary.

In a further embodiment, illustrated in part in FIG. 4, the transceiver T/R also includes sound recognition software 36 that can be trained to decipher which sounds or movements require attention from the caregiver, and which do not. Once the software filters out the unimportant sounds and/or movements, only the remaining ones trigger the picture of the caregiver and the soothing sounds.

In addition, the invention also can include a system by which a sound or movement of an infant or patient in distress triggers an automatic call via cellular or digital means 40 to a mobile telephone 56 of a caregiver. Telephone 56 also includes a video screen that is capable of viewing the infant or patient and also transmitting images of the caregiver back to the patient. Once the caregiver answers the telephone 56 and hears the sounds or a message from the T/R that the infant or patient is in distress, the caregiver can then talk to the infant or caregiver or communicate via video technology, or dispatch appropriate assistance.

In a preferred embodiment, software 36 is programmed so that a low level of distress by the infant or patient triggers light box 10 to transmit the sounds and images of the caregiver to the infant. If the level of distress increases over a certain threshold, or if the distress is not eliminated by the light box, then transceiver T/R transmits the infants sounds and motions to video transceiver 30, for direct interaction with a caregiver. If the distress reaches yet an even higher threshold, or if the distress is not calmed by the previous transmission, then the sounds and motions are transmitted via cellular or digital means 40 to mobile telephone 56. Several different mobile telephone numbers can be programmed into the system so that if one call is not answered, additional calls are made until the call is answered. Alternatively, the means for responding to the infant's distress can be set manually by a switch 37 on the light box. The switch can be set for 1) light box only; 2) transmission to transceiver 30 only; 3) transmission to mobile phone 56 only; or 4) automatic selection via software 36, based on the level of distress of the infant.

The software can also be programmed to respond to only particular distress sounds from particular infants or patients, thus avoiding any problems with interference from television noise, traffic, etc. The system can be set up to respond only to sounds that are similar to a particular cry or other sound from the infant/patient. These sounds can be recorded by the caregiver on a microphone 47 connected to the T/R and input into the software so that the software responds only to sounds that are within a limited range of variation from the pre-recorded sound. Alternatively, the system can be pre-programmed to selectively differentiate between distress sounds and other background noise, regardless of the individual. The system can be programmed to recognize specific distress sounds such as crying, moaning, gasping, calling out, and repetitive coughing.

The invention has been described with respect to preferred embodiments, particularly relating to infant care. However, as those skilled in the art will recognize, modifications and variations in the specific details which have been described and illustrated, such as using the device according to the invention for monitoring the sick and elderly, may be resorted to without departing from the spirit and scope of the invention as defined in the appended claims.

What is claimed is:

1. An apparatus installable in an area occupied by an individual, said apparatus comprising:

A) a microphone and video camera to provide sounds generated by the individual and an image of the individual;

B) an audio and video transmitter connected to the microphone and camera to transmit a signal from said microphone and said video camera that is intercepted by a mobile telephone such that the signal can be heard and seen by an observer at a site remote from the individual; and C) means responsive to sounds of distress emanating from the individual to activate the mobile telephone of the observer, wherein when a distress sound begins, the distress sound and image are transmitted to a mobile telephone of the observer, wherein the device has a recorder connected to the processor and wherein the distress sounds are pre-programmed into a processor connected to the audio and video transmitter by recording particular distress sounds from the individual being monitored, so that only distress sounds that approximately match the pre-programmed distress sounds are transmitted to the mobile telephone.

2. The apparatus as set forth in claim 1, further including means to permit the voice or image of the observer to be transmitted back to the audio or video monitor, said transmission occurring via the mobile telephone.

3. The apparatus as set forth in claim 1, wherein the activate means includes a threshold device to enable the activate means only when the amplitude or duration of the distress sounds exceeds a predetermined threshold level.

4. The apparatus as set forth in claim 1, wherein the distress sounds are selected from the group consisting of crying, choking, coughing, moaning and calling out.

* * * * *